United States Patent [19]

Connolly

[11] Patent Number: 4,814,075
[45] Date of Patent: Mar. 21, 1989

[54] FEED BOX ASSEMBLY

[76] Inventor: James D. Connolly, P.O. Box 5329, Princeton, W. Va. 24740

[21] Appl. No.: 106,351

[22] Filed: Oct. 9, 1987

[51] Int. Cl.⁴ .............................................. B01D 35/00
[52] U.S. Cl. ..................................... 210/156; 210/162; 210/420; 210/456
[58] Field of Search ............... 210/154, 162, 420, 456; 209/243, 273, 244, 253, 274

[56] References Cited

U.S. PATENT DOCUMENTS

| 1,818,267 | 8/1931 | Niks ...................................... 162/347 |
| 3,446,349 | 5/1969 | Benzon ................................. 209/273 |
| 4,604,195 | 8/1986 | Lintunen ............................. 162/336 |

FOREIGN PATENT DOCUMENTS 41-13562  7/1966  Japan ................................. 210/456

Primary Examiner—Peter Chin
Attorney, Agent, or Firm—Wilmer Mechlin

[57] ABSTRACT

A feed box assembly including a feed box for feeding a slurry or other mixture to a screen, the box having an adjustable gate for controlling the rate and impingement angle of the feed on a screen and seals on the gate and cooperating fixed deflectors in and on the box for preventing the fluid mixture during feeding from spewing around sides of the gate.

7 Claims, 3 Drawing Sheets

FEED BOX ASSEMBLY

BACKGROUND OF THE INVENTION

My copending application Ser. No. 903,560, filed Sept. 8, 1986, discloses a feed box having a discharge spout of which one jaw or side is fixed and the other has a flexibly hinged lower part, and adjusting means on the box and acting on the hinged lower part for controlling the rate of feed from the box by varying the cross-sectional area of the spout's outlet. Following common practice, as in Leeman U.S. Pat. No. 3,344,919, the feed control of my copending application is illustrated applied to a sieve, screen or sieve bend mounted in a housing or holder having counterpart ends and reversible end-for-end for alternating the ends of the screen presented for feeding. The present invention is an improvement on that of my copending application.

SUMMARY OF THE INVENTION

The primary object of the present invention is to provide an improved feed box assembly for feeding a solid-liquid or other mixture to a screen whereby the feed is both adjustable in rate and laterally contained over its range of adjustment.

Another object of the invention is to provide an improved feed box assembly for feeding a solid-liquid or other mixture to a screen, the box having a discharge spout of a width to feed said mixture onto and across the screen, the spout including an adjustable feed gate for controlling the rate of feed from the box by varying the cross-sectional area of the spout's outlet, and means in the box for limiting the pressure of the feed at sides of the spout and cooperating with seals on side portions of the gate for laterally containing the feed.

An additional object of the invention is to provide an improved feed box assembly for feeding a fluid mixture to a screen, whereof an elastomerically hinged feed gate selectively adjustable in relative vertical angularity, enables the material to be fed to the screen at a vertical angle ranging from about 0 or parallel to about 20 degrees, and the feed box of the assembly and the feed gate are constructed and arranged to laterally contain between sides of the box both the feed gate and material fed to the screen.

A further object of the invention is to provide an improved feed box assembly for feeding a fluid mixture to a screen, the assembly including a feed box having a discharge spout controllable in the cross-sectional area of its outlet by selective adjustment of an elastomerically hinged vertically angleable feed gate, and preventing material fed to the screen from spewing from sides of the spout by fixed deflectors inset from said sides for limiting the fluid pressure thereon and seals on side portions of the gate sealingly engaging the sides of the spout.

The foregoing and other objects and advantages of the invention will appear hereafter in the detailed description, be particularly pointed out in the appended claims, and be illustrated in the accompanying drawings, in which:

FIGURE DESCRIPTION

DETAILED DESCRIPTION

Figure 1:
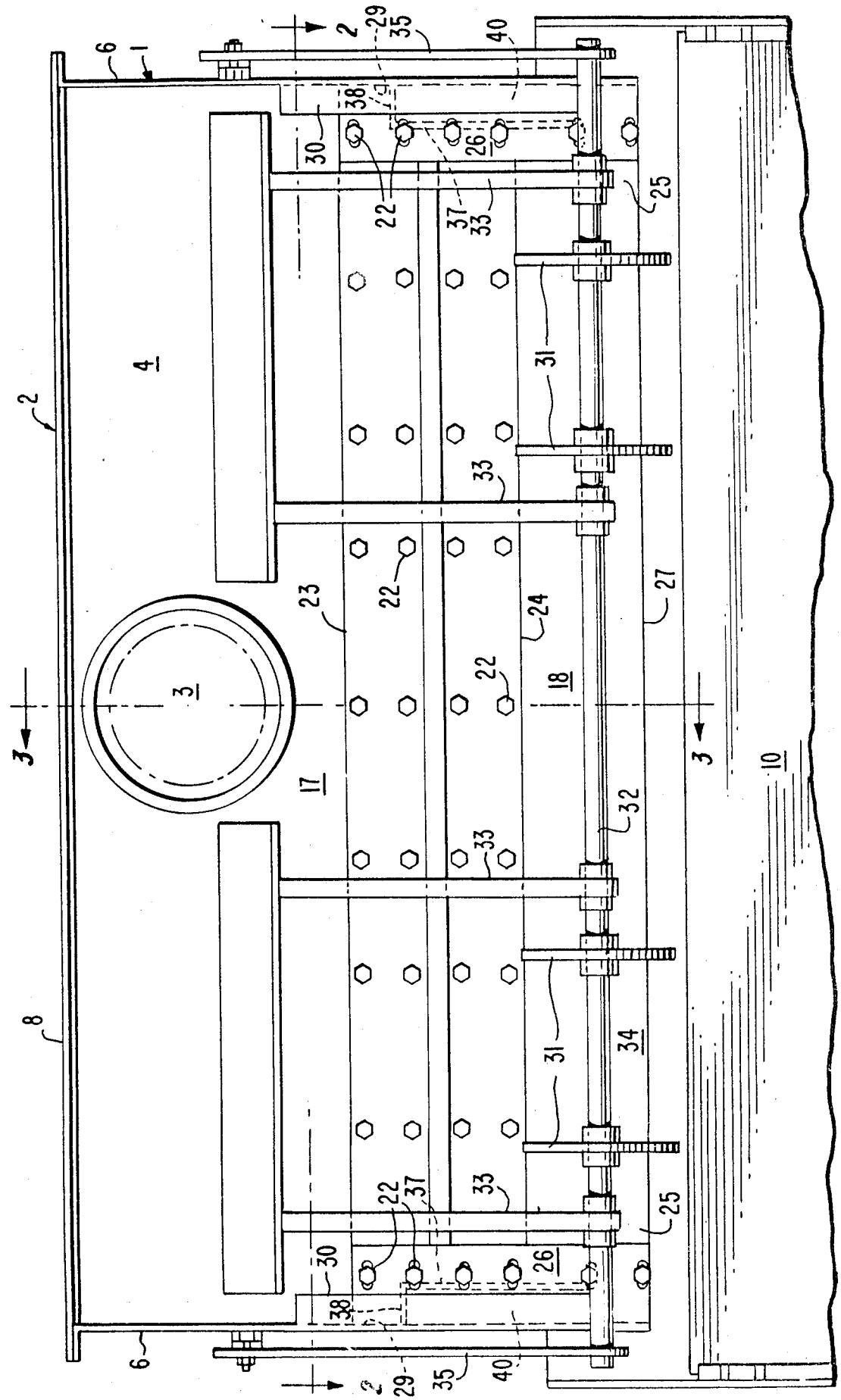
FIG. 1 is a front elevational view of a preferred embodiment of the feed box assembly of the present invention applied for feeding a slurry or other mixture to a sieve bend of which only the upper end portion is shown.
Figure 2:
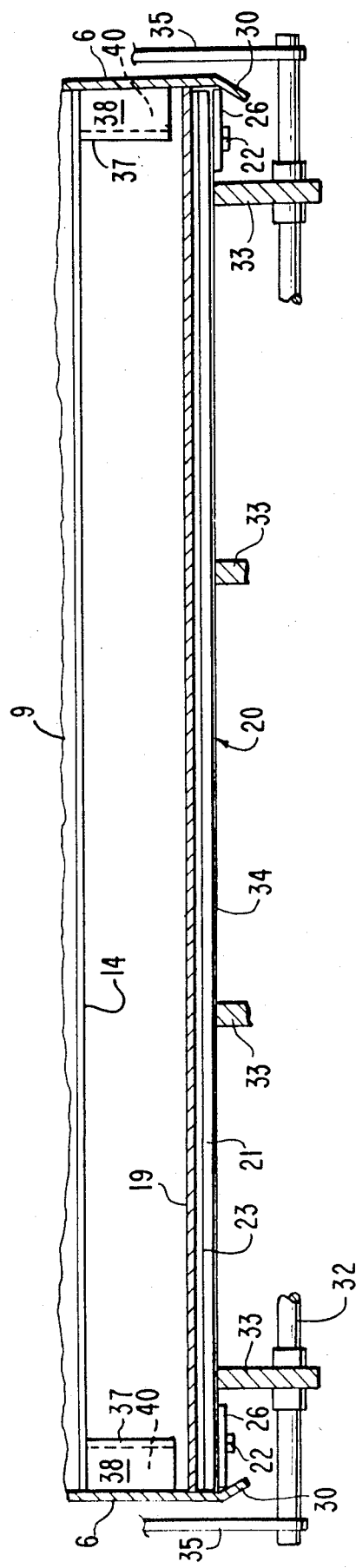
FIG. 2 is a fragmentary horizontal sectional view taken along lines 2—2 of FIG. 1.
Figure 3:
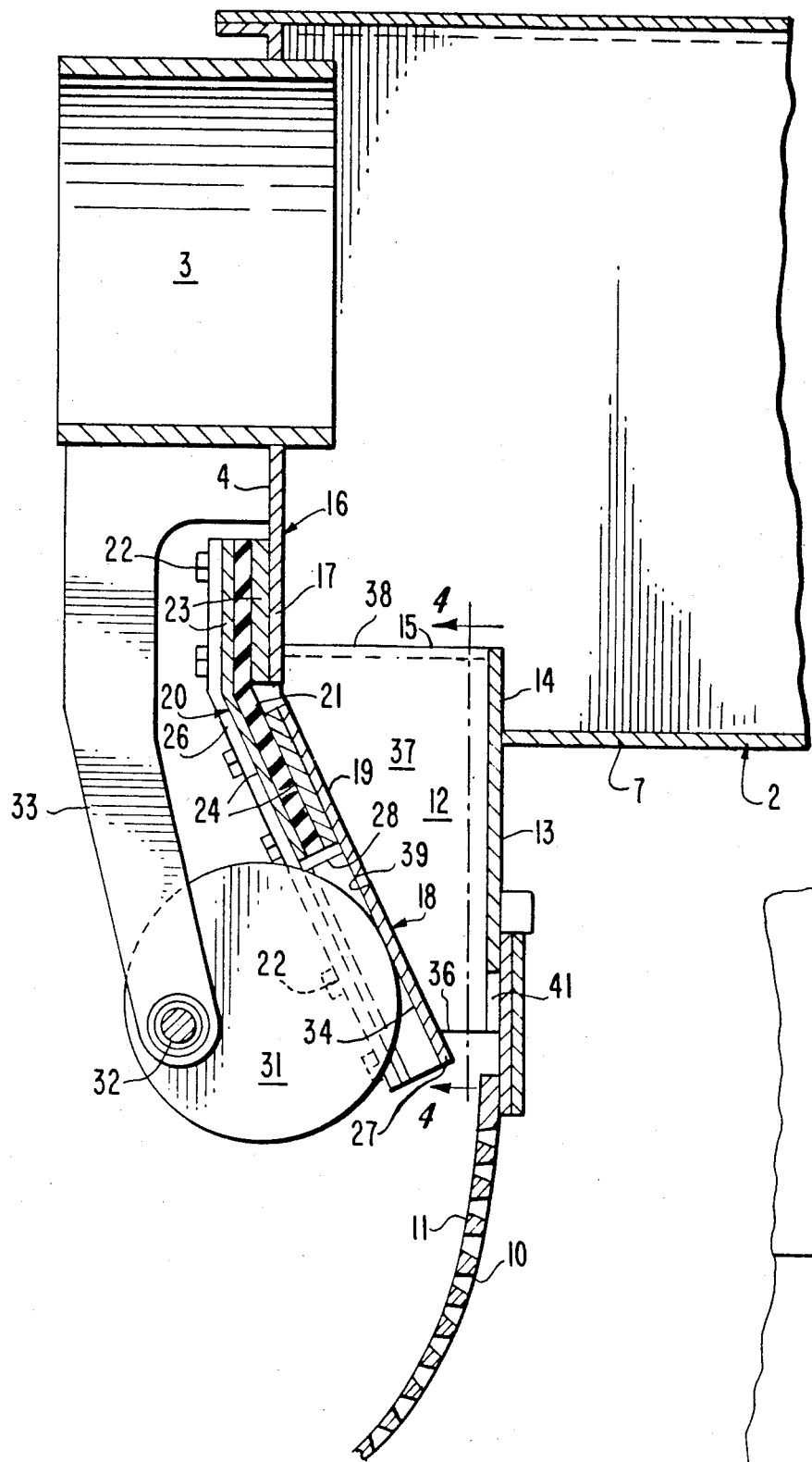
FIG. 3 is a fragmentary vertical sectional view taken along lines 3—3 of FIG. 1.
Figure 4:
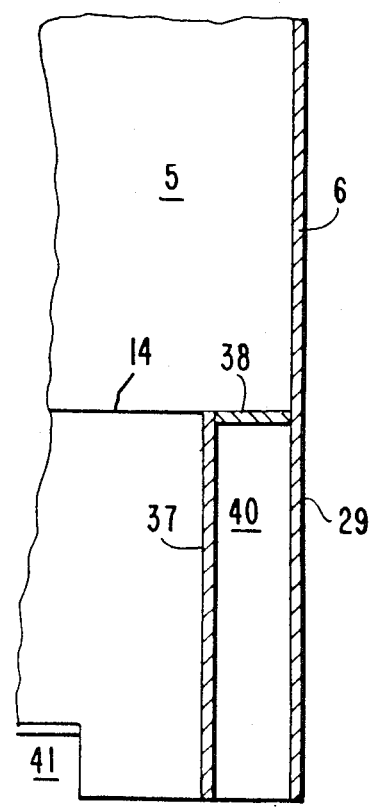
FIG. 4 is a fragmentary vertical sectional view taken along lines 4—4 of FIG. 3.

Referring now in detail to the drawings in which like reference characters designate like parts, the improved feed box assembly of the present invention is particularly designed for feeding a fluid mixture, such as a slurry or other solid-liquid or solids mixture, to a sieve bend or other static screen, as a laterally contained fluid controlled in rate of feed to and angle of impact upon the screen.

Designated as 1, the improved feed box assembly is comprised of a generally box-shaped feed box 2 to which a solid-liquid or other mixture is fed or introduced, usually under pressure, through one or more inlet ports or openings 3, conveniently in the box's vertically disposed front wall or panel 4. In effect a reservoir or tank of a capacity suited to the intended installation for temporarily storing or accumulating the mixture it feeds to a screen, the box 2 desirably has an upright or vertically disposed rear wall or panel 5 parallel to its front wall 4, upright and parallel sides or side walls or panels 6, and a horizontal bottom wall or panel 7, which walls are welded or otherwise fixedly or rigidly connected together. By contrast, a lid 8 of the feed box is detachable for ready access to its interior 9.

As exemplary of its use, the feed box assembly 1 is applied to a screen 10 of the housed, end-for-end reversible type illustrated in my copending application Ser. No. 903,560, of which only the upper end portion or fragment is here shown. The preferred screen 10 is a sieve bend of the type illustrated in Connolly U.S. Pat. No. 4,512,880, which presents for flow therealong of the mixture fed to it, a longitudinally concave screening surface 11 formed conventionally by transversely extending, laterally spaced wedge-shaped screen wires backed by and welded to longitudinally extending tie rods, with the end portion adjacent the feed box substantially vertically disposed.

For feeding or discharging a slurry or other solid-liquid or solids mixture to the screen 10, the feed box 2, intermediate its front and rear walls 4 and 5 has a depending, downwardly opening or directed outlet or spout 12. At the rear, the outlet 12 is bounded by a fixed transverse plate or wall 13 that extends laterally between the side walls 6 and parallel to and inset from the front wall 4 of the box 2. Vertically, the spout's fixed rear wall 13 interrupts and extends above and below the box's bottom wall 7, above, to form a dam 14 in the box at the inside of the spout's inlet or intake 15. A front wall 16 of the spout 12 has a fixed upper part 17 spaced forwardly of and parallel to its rear wall and desirably ending or terminating downwardly above the box's bottom wall 7. With its upper part 17 fixed, the spout's front wall 16 has as a lower part a feed gate 18 suspended from and elastomerically hinged to its upper part for vertical angling relative to its rear wall 13.

Spaced below the fixed upper part 17 sufficiently to accommodate its desired range of relative angling, the feed gate 18 has as a backing confronting the inner or rear wall 13, a discharge plate 19 of a height to extend vertically below the rear wall. Fronting and hingedly connecting the upper part 17 and feed gate or lower part 18 and extending substantially the full width of the feed gate, is an elastomeric hinge 20 preferably comprised of a relatively narrow, heavy gauge flexible strip or sheet 21 of a suitable elastomer, such as rubber or polyurethane. Straddling or overlapping the upper and lower parts 17 and 18, the elastomer sheet 21 is sandwiched or clamped, as by bolts 22, between vertically shaped upper and lower pairs of mounting bars or blocks 23 and 24, the inner bars of which conveniently are attached by the same bolts to the fronts, respectively, of the fixed upper and hinged lower parts of the spout's front wall 16. The spout 12 also has or carries on each of the opposite side portions 24 of its front wall 16, outwardly or forwardly of the hinge 20, one of a pair of rubber or like wipers or wiper blades 26, which desirably extend substantially from the upper end of the hinge to the feed gate's lower end 27 and are bolted or attached to the spout's front wall for relative lateral adjustment, suitably by the adjoining rows of the bolts 22. The desired uniform spacing of the wipers 25 from the spout's front wall 16 is maintained by an interposed spacer or filler 28 in each end portion below the hinge 20.

Sides 29 of the spout 12, formed in part as forward and downward extensions of the box's side walls or plates 6, laterally contain the spout's front wall 16, including the feed gate 18, and, forwardly of the front wall, terminate the inturned lips or flanges 30 laterally and preferably vertically overlapping that wall. Downwardly, the sides 29 suitably are substantially coterminous with the feed gate 18 and extend below the rear wall 13.

As does the feed control of my copending application Ser. No. 903,560, the feed box assembly of this application depends on the hydraulic head of the mixture in the feed box 2 for applying an opening force or pressure on the hinged feed gate 18 and on a plurality of discs 31 for opposing that force or pressure. The discs 31 are eccentrically and non-rotatably mounted on a common shaft 32 journaled or mounted for rotation about a horizontal axis parallel to and forwardly of the feed gate on a plurality of laterally spaced struts or brackets 33 fixed to and depending from the feed box. Acting or bearing against the opposing face or front 34 of the feed gate or discharge plate 18 below the hinge 20, the discs are selectively turnable or rotatable in and settable in a predetermined position within a limited arc by a vertically swingable or angleable handle 35 on one or each end of the shaft 32. So selectively turnable, the discs 31 enable the cross-sectional area of the discharge opening or outlet 36 at the bottom of the spout 12 to be preselectively varied or adjusted and thereby selectively or adjustably control the rate of feed or discharge of the slurry or other mixture from the feed box 2 to the screen 10.

Under the same hydraulic head, the pressure of the feed at the discharge opening or outlet 36 of the spout 12 will vary inversely with the area of the opening. Thus, in the present assembly, for a given hydraulic head, the pressure of the feed at the discharge opening or outlet 36 will be at minimum when the areas of the spout's inlet 15 and outlet are substantially the same and at maximum at the maximum acute vertical angle of inclination of the feed gate 18 relative to the spout's rear wall 13. The preferred range of vertical angling of the feed gate 17 is from about 0 to about 10 or 20 degrees for producing a corresponding range in the angle of impingement of the feed on the screen 10 of from 0 or parallel feeding to back feeding under pressure at an acute angle of up to about 20 degrees.

Back feeding in particular but even parallel feeding if the hydraulic head is sufficient, present the problem of lateral spilling or spewing of part of the feed mixture from sides 29 of the spout 12 before it reaches the screen 10. Such lateral spilling is prevented, inhibited or mitigated against in the feed box assembly of the present invention by several features. One is the pair of wipers 26 on opposite side portions 25 of the spout's front wall 16 that are laterally adjustable to wipe against or sealingly engage the spout's sides 29. Another is the the pair of inturned flanges 30 on the sides 29 outwardly or forwardly of the feed gate 18 that serve to direct inwardly toward the screen 10 any feed that escapes past the wipers 26. Still another is the provision in the spout 12 adjacent its opposite sides 29 of a pair of baffles or deflector plates 37, one for each side. Fixed, as by welding, to and substantially coterminous vertically with the spout's rear wall 13 and spaced from and parallel to and connected by caps 38 to the adjoining sides 29, the baffles 37 conform in their leading or front edges 39 to the contour of the confronting back of the fixed upper part 17 and also to that of the feed gate 18 at maximum angling thereof and engage or contact the upper part and are engageable with and act as a stop for limiting maximum angling of the feed gate. With the baffles 37 so constructed and positioned, the spout 12 has at either side a top closed, front and bottom opening chamber or compartment 40 which by deflecting the mixture fed under pressure away from the sides 29, produce low or reduced pressure areas at the sides. The wipers 26, inturned flanges 30 and capped baffles 37 thus effectively cooperate for preventing lateral spilling or spewing and consequent partial loss of the feed mixture.

The spout's front wall 4 and sides 29 are downwardly substantially coterminous and extend or project below the rear wall 13. Not only is the rear wall 13 the shorter, desirably by about 1 to 3 inches (2.54 to 7.62 cms), but between the baffles or deflector plates 37, it preferably is undercut or interrupted by a slot 41 for increasing the area and consequent rate of flow or discharge of the slurry or other mixture through the high pressure or intermediate part of the discharge opening 36. The slotting or undercutting of the rear wall 13 thus avoids substantial choking or throttling of the discharge even when the screen 10 is backfed at a maximum impact angle of from about 10 to about 20 degrees by setting the feed gate 18 at a corresponding vertical angle.

How the interior of the box 2 and spout 12 are finished or surfaced will depend on the characteristics of the mixture the assembly 1 is designed to handle. For a mixture that is only mildly abrasive and non-corrosive the interior may be unlined. However, for handling a mixture, such as a coal slurry that ordinarily is both quite abrasive and corrosive, the internal surfaces of the box 2 and spout 12 exposed in service to the mixture may be protected by an abrasive and corrosion-resistant ceramic or other suitable liner.

From the above detailed description it will be apparent that there has been provided an improved feed box assembly which is adapted to feed a fluid or other mixture as a laminar stream or sheet to a screen at a controlled rate without lateral spilling at an angle of impact ranging from about 0 to about 20 degrees and without substantial choking even at or about the maximum feed angle. It should be understood that the described and disclosed embodiment is merely exemplary of the invention and that all modifications are intended to be included that do not depart from the spirit of the invention and the scope of the appended claims.

Having now described my invention, I claim:

1. A feed box assembly for feeding a solid-liquid or other mixture to a screen, comprising a feed box having a discharge spout for discharging said mixture therefrom onto and across said screen, and means for preventing lateral spilling of said mixture during said discharge, said means including top closed front and bottom opening compartments in said box on opposite sides of said spout, said compartments each being bounded inwardly by an upstanding deflector plate spaced inwardly from an adjoining side for reducing the pressure of said discharging mixture adjacent said sides by deflecting said mixture inwardly therefrom.

2. A feed box assembly according to claim 1, wherein the spout has a fixed rear wall, a front wall having a fixed upper part and as a lower part a feed gate elastomerically hinged for relative vertical angling to said upper part, and fixed sides laterally containing said front wall, and the spilling preventing means include wipers mounted for lateral adjustment on opposite side portions of said front wall and sealingly engageable with said sides for restraining said mixture against lateral spilling.

3. A feed box assembly according to claim 2, wherein the deflector plates have rearwardly and downwardly sloping front edge portions engageable with said feed gate for limiting rearward vertical angling thereof.

4. A feed box assembly according to claim 3, including inturned flanges on sides of said spout forwardly of the front wall thereof, said flanges, wipers and compartments cooperating for preventing lateral spilling of the mixture during discharge thereof.

5. A feed box assembly according to claim 3, wherein the feed gate is angleable rearwardly relative to the rear wall of the spout in a range of from about 0 to upwards of about 20 degrees for backfeeding the screen at a corresponding impact angle.

6. A feed box assembly according to claim 5, wherein the bottom of the rear wall of the spout between the deflector plates is undercut for minimizing throttling of discharge of the mixture when the vertical angle of the feed gate is in a range of about 10 to 20 degrees.

7. A feed gate assembly according to claim 1, wherein the discharge spout has a fixed rear wall, a front wall having a fixed upper part and as a lower part a feed gate connected by an elastomeric hinge for relative vertical angling to said upper part, said hinge including an elastomer sheet clamped between upper and lower pairs of mounting bars, and said upper and lower pairs of bars are mounted respectively on said upper part and said lower part.

* * * * *